Oct. 31, 1950 — W. W. MAHER — 2,527,560
CAN TESTING HEADS WITH CAN SHIFTING FINGERS
Filed Dec. 2, 1947 — 2 Sheets-Sheet 1
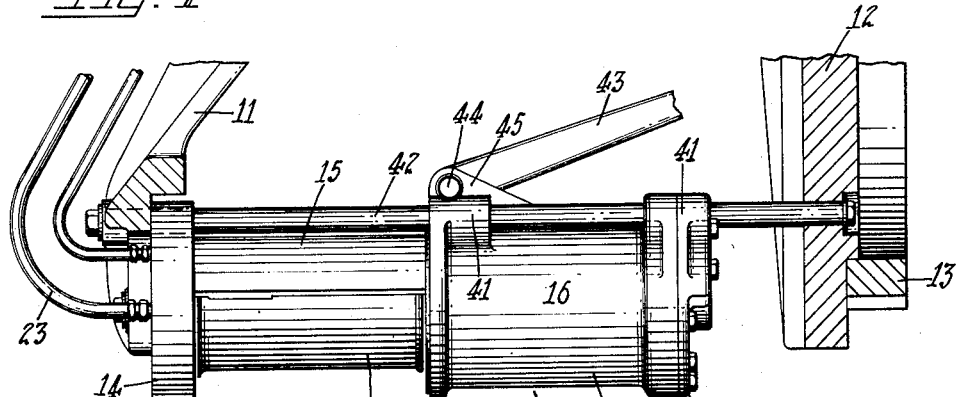
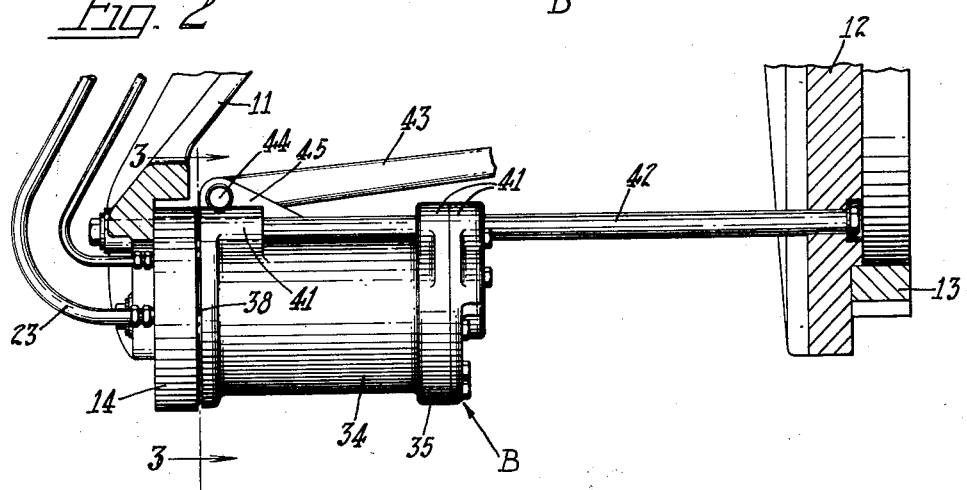
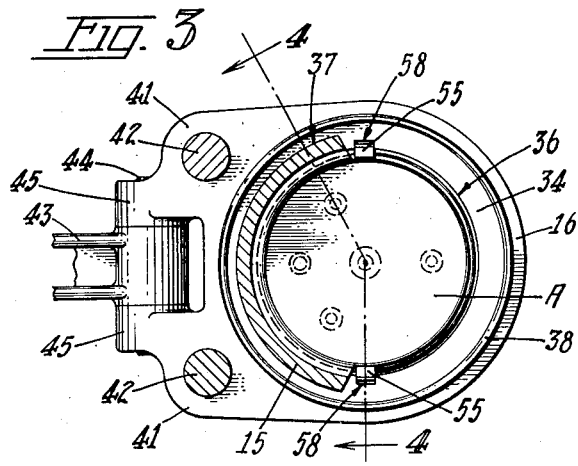
INVENTOR
William W. Maher
BY Ivan D. Thornburgh
Charles H. Erne
ATTORNEYS Patented Oct. 31, 1950

2,527,560

UNITED STATES PATENT OFFICE 2,527,560

CAN-TESTING HEADS WITH CAN-SHIFTING FINGERS

William W. Maher, San Francisco, Calif., assignor to American Can Company, New York, N. Y., a corporation of New Jersey Application December 2, 1947, Serial No. 789,286

4 Claims. (Cl. 73—40)

The present invention relates to container or can testing machines in which the cans are subjected to air under pressure to detect those which leak and has particular reference to devices in the machine for releasing the cans from the testing heads after testing.

In some testing machines, the cans to be tested are individually confined in a sealed testing head which holds the open end of the can during the testing operation firmly against a resilient sealing pad located within the head. After completing the test, the tested can often adheres to the sealing pad and causes difficulty in its removal for discharge from the machine. Such a can sometimes jams the machine and causes damage to it, with resultant loss in production until repairs are effected.

The instant invention contemplates overcoming this difficulty by the provision of devices which free the can from its sealing head upon completion of the testing operation to facilitate discharge of the tested can from the machine.

An object of the invention is the provision in a can testing machine of can release devices wherein release of tested cans from their testing heads is insured to facilitate discharge of the cans from the machine so that jamming of the machine will be prevented.

Another object is the provision of such can release devices wherein a released can is held in a predetermined position for proper cooperation with the discharge devices of the machine to facilitate discharge of the tested cans from the machine.

Another object is the provision of such can release devices which are of compact form and of simple efficient construction so that they may be readily incorporated in each sealing head without the requirement of intricate mechanism for operating them.

Numerous other objects and advantages of the invention will be apparent as it is better understood from the following description, which, taken in connection with the accompanying drawings, discloses a preferred embodiment thereof.

Referring to the drawings:

Figure 1 is a side elevation of a can testing head embodying the instant invention, the head being shown in an open position with a can as received in place prior to testing, with portions of the head supports being shown in section and with parts broken away;

Fig. 2 is a view similar to Fig. 1 with the testing head in a closed position, confining the can for testing;

Figure 4:
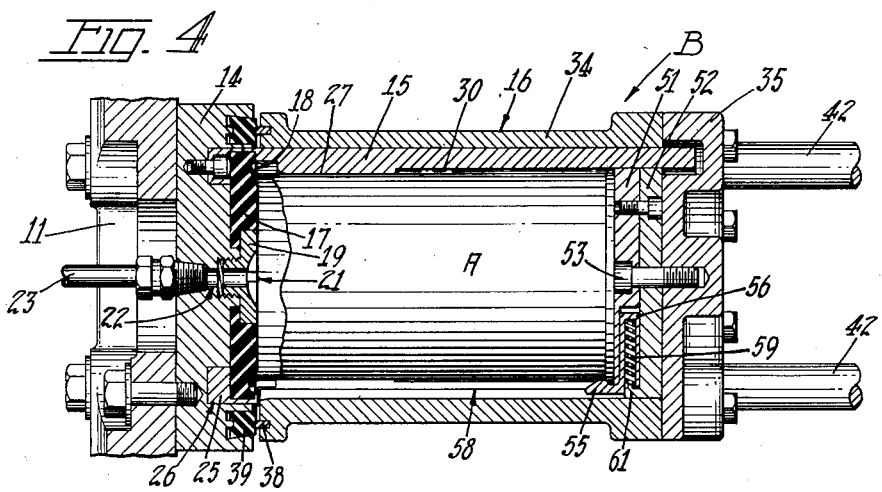
Figure 5:
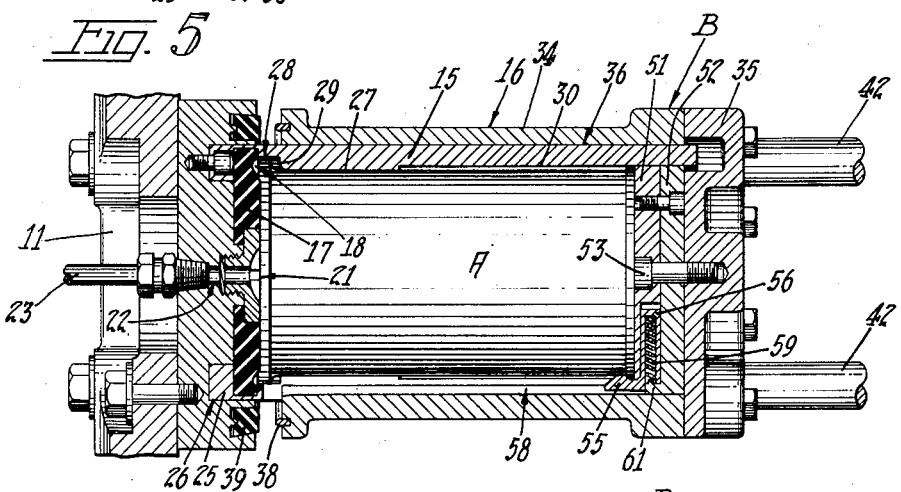
Figure 6:
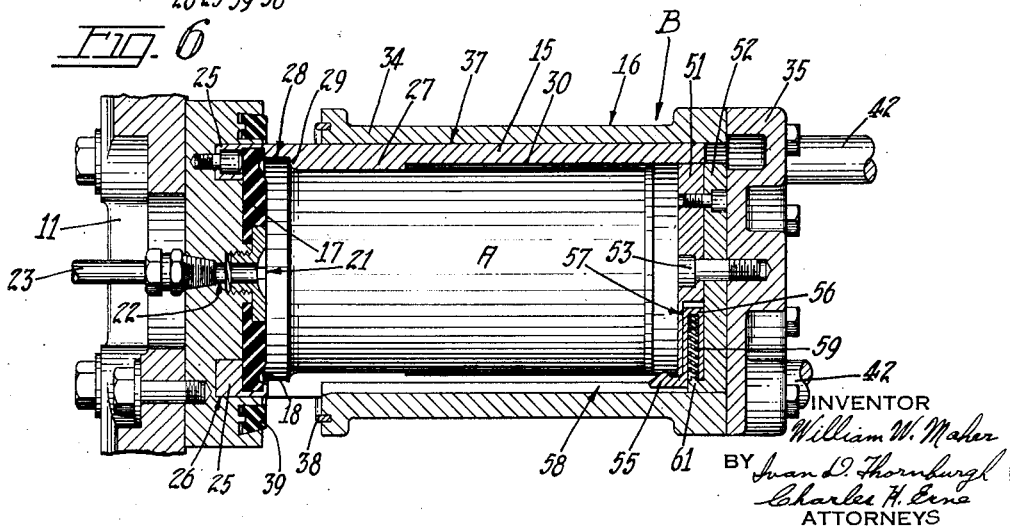

Fig. 3 is an enlarged sectional view taken substantially along the line 3—3 in Fig. 2, with parts broken away; and Figs. 4, 5 and 6 are sectional views taken substantially along the broken line 4—4 in Fig. 3, with parts broken away, the views showing certain of the parts and a can in different positions during the release of the can for discharge from the head after testing.

As a preferred embodiment of the instant invention the drawings illustrate principal testing head parts of a can testing machine of the type disclosed in my United States Patent 2,232,711 issued February 25, 1941 on Can Testing Apparatus. In such a machine sheet metal cans A having one end open are subjected to air under pressure and if found to leak are discharged from the machine by way of a leaky can outlet, while good cans, i. e. cans which do not leak are discharged from the machine by way of a good can outlet.

Testing of a can is effected in a sealing head B. There are a plurality of these heads arranged in a circle around a pair of spaced and parallel rotatable support wheels 11, 12 (Figs. 1 and 2) which are continuously rotated by a gear 13 secured to the wheel 12. The wheels may be horizontal as in my patent above mentioned or may be vertical as disclosed in United States patent 2,019,517 issued November 5, 1935 to M. E. Widell, on Can Testing Machine.

Each testing head B includes a fixed sealing pad 14, a can retaining cradle 15, and a movable chamber or housing 16 adapted to telescope over the cradle and a can therein for hermetically confining the can for the testing operation. The sealing pad is bolted to the support wheel 11 and carries a resilient sealing ring 17, preferably made of rubber or the like material, against which the open or flanged end of the can to be tested is clamped during the testing operation. This sealing ring 17 adjacent its outer periphery is formed with an annular recess or groove 18 for the reception of the flange of the can to insure a hermetic fit between the can and the ring. The sealing pad also carries an insert 19 having an orifice 21 through which compressed air is introduced into the interior of the can. This orifice communicates with a channel 22 in the sealing pad and the channel communicates with a tube 23 which leads to any suitable source of compressed air.

The cradle 15 is semicylindrical in cross-section and constitutes a half mould for supporting a can A in a horizontal position disposed at right angles to the sealing pad 14 and in axial alignment therewith. For this purpose the cradle extends laterally from the inner face of the sealing pad and is held in place by a ring 25 (Figs. 4, 5 and 6) which is formed on the cradle. The ring is disposed in an annular groove 26 in the pad and is bolted to the pad.

The inner surface of the cradle 15 is formed with a curved wall section 27 which engages and partially surrounds the body of a can A adjacent its flange. Adjacent the sealing pad 14, the inner surface of the cradle is relieved to form a clearance groove or recess 28 for the flange of the can and to provide a flange stop or shoulder 29 for use in locating the can for discharge after a testing operation as will be explained more fully hereinafter. Beyond the body support wall section 27, the inner surface of the cradle is enlarged or cut away to form a curved seam support wall section 30 for supporting engagement with the end seam of the can.

The movable housing 16 comprises a cylindrical tubular shell 34 having an end member 35 bolted to the outer end thereof and thus encloses a testing chamber 36 having its inner end open. The inside diameter of the housing shell is of a dimension just sufficient to permit the housing to telescope over a can A and its cradle, with a slight amount of clearance. One side of the inner surface of the shell is formed with an enlarged diameter curved clearance recess 37 for the cradle 15 while the opposite side is just slightly larger than the can as best shown in Fig. 3. Adjacent its open end, the housing shell 34 carries a rigid sealing ring 38 for hermetic sealing engagement with a resilient sealing ring 39, made of rubber or the like material, disposed in an annular recess formed in the inner face of the sealing pad 14.

The housing 16 is mounted in alignment with the longitudinal axis of the can cradle 15 and is movable along this axis toward and away from the sealing pad 14. For this purpose the housing shell 34 and its end member 35 are formed with pairs of spaced slide bearings 41 (Figs. 1, 2 and 3) which surround a pair of stationary spaced and parallel slide bars 42 disposed in parallelism with the axis of the can cradle 15. The ends of the bars are secured in the support wheels 11, 12. Reciprocal movement of the housing along the bars is effected in any suitable manner in time with the other moving parts of the machine, by a link 43, one end of which is mounted on a pivot pin 44 carried in a pair of spaced lugs 45 which extend out from the housing.

Provision is made for shifting a can A in its cradle 15, into testing engagement with the sealing pad 14 prior to the test being made and for pulling the can away from the pad after the test, in time with the movement of the housing 16. This shifting of the can is brought about preferably by a two piece shifter block comprising a pair of discs 51, 52 (Figs. 4, 5 and 6) which are bolted together, and which as a unit are secured by a screw 53 to the inner face of the housing end member 35. The shifter block carries a pair of diametrically opposed L-shaped snap fingers or hook shaped latches 55 (see also Fig. 3) formed with slide shanks 56 which are disposed between the discs 51, 52 and are located in slide grooves 57 formed in the inner disc 51.

The fingers 55 extend beyond the discs 51, 52 and project into clearance grooves 58 formed in the inner surface of the housing shell 34. Compression springs 59 located within the shanks of the fingers 55 press the fingers inwardly toward the center of the housing. The peripheral edge of the inner disc 51 serves as a stop for limiting this inward travel of the fingers. The outer ends of the springs engage against diametrically disposed stop lugs 61 formed on the outer peripheral edge of the outer disc 52. These lugs extend into the finger clearance grooves 58 in the housing and hold the shifter block discs as a unit from rotating relative to the housing.

In operation, a can A to be tested is seated in its cradle 15 with its open flanged end adjacent the sealing pad 14 when the housing 16 is separated from and in spaced relation to the sealing pad as best shown in Fig. 1. With the can in its cradle, the housing moves forward, toward the left as viewed in Fig. 1 and telescopes the can and its cradle and moves toward the sealing pad 14. Near the end of this forward stroke of the housing, the hook shaped fingers 55 snap over the end seam of the bottom of the can and the shifted discs 51, 52 engage against the can as best shown in Fig. 4. As the housing continues to move forward the bottom of the can is held by the fingers and the shifted discs push the can forward with the housing. This shifting of the can brings its open end into engagement with the sealing pad 14, with the flange of the can tightly seated in the recess 18 of the pad sealing ring 17 as best shown in Fig. 4. The interior of the can is thus sealed off from its exterior and is in communication with the compressed air orifice 21 in readiness for testing.

In this testing position of the can, the housing 16 is closed against the sealing pad 14 as shown in Figs. 2 and 4, with its rigid sealing ring 38 in hermetic engagement with the outer sealing ring 39 on the sealing pad. The can is thus hermetically confined within the housing. While the can is thus confined within the housing the testing operation on the can is performed in the usual manner as explained in the patents mentioned hereinbefore, this testing operation forming no part of the instant invention.

After testing, the housing 16 is shifted away from the sealing pad 14 into its orginal open position shown in Fig. 1 to release the can for discharge into a good can outlet or a bad can outlet as explained hereinbefore in accordance with the results of the test. During the first portion of this shifting stroke, the hook shaped fingers 55 in the housing pull the can away from the resilient sealing ring 17 in the sealing pad 14 and thus insure release of the can from the pad. As the released can retreats from the sealing pad with the housing 16, its flange passes through the flange clearance recess 28 in the cradle 15 and engages against the stop shoulder 29 in the cradle. This engagement of the flange with the stop shoulder arrests further shifting of the can with the housing 16 and thus locates the can in a predetermined position for discharge. With the can thus held against further movement, the still moving housing strips or disengages the fingers 55 from the bottom of the can as best shown in Fig. 6 and the housing thereafter moves clear of the can into the position shown in Fig. 1. Thus the can is completely freed from the sealing pad 14 and from the housing 16 and rests freely within its cradle 15 for discharge from the machine by way of the proper outlet.

With such a construction of testing head, the can is under control at all times and is positively shifted into and out of engagement with the sealing pad 14 in such a manner as to prevent sticking of the can to the pad and thus prevents jamming of the machine and damaging of its parts.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for testing for leaks containers having an open end, the combination of a movable support, a container testing head carried on said support and including a sealing pad having a resilient sealing ring engageable with an open end of a container during the testing of the container, a cradle secured to said sealing pad and extending at right angles thereto for receiving and supporting the container in axial alignment with said sealing pad for the test, a housing enclosing a chamber open at one end and telescopically movable over said cradle and the container therein into a position in hermetic sealing engagement with said sealing pad for enclosing and confining said container for the test, engaging means located within said chamber and engageable with the container received therein for pulling it away from said sealing pad after the test, and stripper means formed in said cradle for releasing the container from said engaging means for freeing the container for discharge from the machine.

2. In a machine for leak testing a container having an open end and a closed seamed end, the combination of a container testing head including a sealing pad engageable with the open end of a container during the testing of the container, a housing enclosing a testing chamber open at one end, said housing being telescopically movable over the container and into hermetic sealing engagement with said sealing pad for enclosing said container for the test, a shifter block carried in said housing and engageable with the closed end of said container for pushing the open end of the container into hermetic sealing position against said pad during the sealing movement of said housing, a plurality of spring-pressed fingers radially disposed in said block and engageable with the seam of the container during said housing movement, and means secured to said sealing pad for engaging the container during the return movement of said housing to pull it away from said fingers preparatory to discharging the container from the machine.

3. In a machine for leak testing a container having an open flanged end and a closed seamed end, the combination of a container testing head including a sealing pad engageable with the open end of a container during the testing of the container, a housing enclosing a testing chamber open at one end and located adjacent said sealing pad, a cradle secured to said sealing pad and having an axis in axial alignment with said sealing pad for holding the container, said housing being telescopically movable over container and cradle and into hermetic sealing engagement with said sealing pad for enclosing the container for the test and for bringing the open end of the container into hermetic sealing position against said pad, a plurality of spring-pressed fingers mounted in said housing and engageable with the seam of the container during said housing movement for assisting said cradle in holding the container, and stripper means formed in said cradle for engaging the flange of the container during the return movement of said housing to pull the container away from said fingers after the test preparatory to discharging the container from the machine.

4. In a machine for leak testing a cylindrical container having an open end and a closed seamed end, the combination of a container testing head including a circular sealing pad engageable with the open end of a container during the testing of the container, a cylindrical housing located at one side and having its axis on the center of said sealing pad and enclosing a testing chamber open at the end adjacent said pad, a semi-circular cradle secured to said sealing pad and projecting laterally therefrom said cradle having an interior surface for engaging the outer surface of the seam of the container to center the container relative to said pad and housing, said cradle interior also having a curved wall section for engaging the container wall to hold the axis of the container on the axis of said housing prior to and during the test, means for moving said housing telescopically over the container and into hermetic sealing engagement with said sealing pad for enclosing the container for the test, and engaging means spaced about the axis of said housing for engaging the seamed end of the container during movmeent of said housing for holding the container in said cradle and for pulling the container away from said sealing pad after testing preparatory to its discharge from the machine.

WILLIAM W. MAHER.

REFERENCES CITED

The following references are of record in the file of this patent:

UNITED STATES PATENTS

| Number | Name | Date |
|---|---|---|
| 1,118,478 | Dixon | Nov. 24, 1914 |
| 1,861,542 | McDonald et al. | June 7, 1932 |
| 1,971,065 | Dieter | Aug. 21, 1934 |
| 2,341,292 | Reynolds | Feb. 8, 1944 |
| 2,428,598 | Weaver | Oct. 7, 1947 |